US010771201B2

(12) United States Patent
Agarwal et al.

(10) Patent No.: US 10,771,201 B2
(45) Date of Patent: Sep. 8, 2020

(54) ON-DEMAND RETRANSMISSIONS IN BROADCAST COMMUNICATION

(71) Applicant: QUALCOMM Incorporated, San Diego, CA (US)

(72) Inventors: Vishal Agarwal, Ramnagar (IN); Giriraj Goyal, Bangalore (IN); Srinath Ananthaswamy, Basavanagar (IN)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 16/184,673

(22) Filed: Nov. 8, 2018

(65) Prior Publication Data
US 2020/0153567 A1 May 14, 2020

(51) Int. Cl.
H04L 12/801 (2013.01)
H04L 5/14 (2006.01)
H04L 29/06 (2006.01)
H04L 1/20 (2006.01)
H04L 1/18 (2006.01)

(52) U.S. Cl.
CPC .............. H04L 1/20 (2013.01); H04L 1/1867 (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0232041 A1* | 9/2009 | Smith | ............. | H04W 12/04033 370/312 |
| 2011/0097997 A1* | 4/2011 | Huang | .............. | H04W 72/1263 455/41.2 |
| 2012/0289158 A1* | 11/2012 | Palin | ...................... | H04W 8/005 455/41.2 |
| 2014/0355517 A1* | 12/2014 | Reunamaki | ........... | H04W 8/005 370/328 |
| 2017/0331577 A1* | 11/2017 | Parkvall | ............... | H04B 7/0848 |
| 2017/0331670 A1* | 11/2017 | Parkvall | ............... | H04J 11/0079 |
| 2017/0366596 A1* | 12/2017 | Han | .................. | H04W 28/0236 |
| 2018/0368017 A1* | 12/2018 | Sundararajan | ...... | H04W 72/085 |
| 2019/0021014 A1* | 1/2019 | Martin | .................. | H04W 16/14 |
| 2019/0090293 A1* | 3/2019 | Su | ..................... | H04W 56/0015 |

* cited by examiner

Primary Examiner — Brian S Roberts
Assistant Examiner — Abusayeed M Haque
(74) Attorney, Agent, or Firm — Holland & Hart LLP/Qualcomm

(57) ABSTRACT

Methods, systems, and devices for wireless communications are described. Described techniques may include broadcasting a first Bluetooth packet over a channel bandwidth during a first set of one or more master slots of a periodic broadcast window; performing one or more received signal strength indication (RSSI) measurements during a first set of one or more slave slot of the periodic broadcast window; receiving from one or more receiving devices, based at least in part on the one or more RSSI measurements, one or more negative acknowledgement (NACK) signals corresponding to the first Bluetooth packet; and rebroadcasting, during a second set of one or more master slots of the periodic broadcast window, the first Bluetooth packet based at least in part on the one or more NACK signals.

20 Claims, 10 Drawing Sheets

ON-DEMAND RETRANSMISSIONS IN BROADCAST COMMUNICATION

BACKGROUND

The following relates generally to wireless communications, and more specifically to on-demand retransmission in broadcast communications.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, Bluetooth communications may require enhanced quality of service. For example, successful bidirectional transmission of audio information for voice may have a relatively low tolerance for packet loss or timing issues. The link quality between two devices may affect the data rate used for communications (e.g., as poor link quality may be associated with reduced bitrates for more robust communications).

For devices performing Bluetooth wireless communications (e.g., sending and receiving Bluetooth packets (e.g., DH5, 2-DH5, 3-DH5, etc.), a typical packet error rate may be, for example, 5%. In such examples, a receiver may receive a first transmission of one or more data packets correctly the first time 95% of the time. However, to address the packet error that may occur for only 5% of all traffic, all traffic may be retransmitted multiple times. For instance, if a single packet in a string of packets is unsuccessfully received, the entire string of packets may be retransmitted. These multiple retransmissions may cost a significant amount of bandwidth and may result in unnecessarily high throughput. For example, if the number of retransmissions is two, then an overall bandwidth requirement may be three times the audio rate. Additionally, in cases where the transmissions and retransmissions are performed over periodic intervals, system latency may increase. In cases where transmissions are repeated using, for instance, erasure encoding, latency may be increased even more.

SUMMARY

The described techniques relate to improved methods, systems, devices, and apparatuses that support on-demand retransmissions in broadcast communication. In some examples, a Bluetooth system may send broadcast communications, and may send on-demand retransmissions to address packet reception failures. A whole channel bandwidth may be divided into two recurring periodic windows: a broadcast window and an idle window. During the broadcast window, a broadcasting device may send data packets. In some examples, all receivers may be expected to listen to the broadcaster during the broadcast window. The broadcaster may transmit or retransmit each data packet based on negative acknowledgement (NACK) signals received from any one of the receiving devices. That is, if no NACK signal is received from any receiving device, then the broadcasting device may transmit a second packet. However, if any one of the receiving devices transmits a NACK signal during a slave slot following the transmission of the first packet, then the broadcasting device may retransmit the first packet. During the idle window, broadcasting and receiving devices may perform other independent activities (e.g., band scanning, synchronization train procedures, procedures for adding new receivers into the broadcast network, and the like).

A method of wireless communications is described. The method may include broadcasting a first Bluetooth packet over a channel bandwidth during a first set of one or more master slots of a periodic broadcast window, performing one or more received signal strength indication (RSSI) measurements during a first set of one or more slave slot of the periodic broadcast window, receiving from one or more receiving devices, based on the one or more RSSI measurements, one or more NACK signals corresponding to the first Bluetooth packet, and rebroadcasting, during a second set of one or more master slots of the periodic broadcast window, the first Bluetooth packet based on the one or more NACK signals.

An apparatus for wireless communications including is described. The apparatus may include a processor, memory in electronic communication with the processor, and instructions stored in the memory. The instructions may be executable by the processor to cause the apparatus to broadcast a first Bluetooth packet over a channel bandwidth during a first set of one or more master slots of a periodic broadcast window, perform one or more received signal strength indication (RSSI) measurements during a first set of one or more slave slot of the periodic broadcast window, receive from one or more receiving devices, based on the one or more RSSI measurements, one or more NACK signals corresponding to the first Bluetooth packet, and rebroadcast, during a second set of one or more master slots of the periodic broadcast window, the first Bluetooth packet based on the one or more NACK signals.

Another apparatus for wireless communications including is described. The apparatus may include means for broadcasting a first Bluetooth packet over a channel bandwidth during a first set of one or more master slots of a periodic broadcast window, performing one or more received signal strength indication (RSSI) measurements during a first set of one or more slave slot of the periodic broadcast window, receiving from one or more receiving devices, based on the one or more RSSI measurements, one or more NACK signals corresponding to the first Bluetooth packet, and rebroadcasting, during a second set of one or more master slots of the periodic broadcast window, the first Bluetooth packet based on the one or more NACK signals.

A non-transitory computer-readable medium storing code for wireless communications including is described. The code may include instructions executable by a processor to broadcast a first Bluetooth packet over a channel bandwidth during a first set of one or more master slots of a periodic broadcast window, perform one or more received signal strength indication (RSSI) measurements during a first set of one or more slave slot of the periodic broadcast window, receive from one or more receiving devices, based on the one or more RSSI measurements, one or more NACK signals corresponding to the first Bluetooth packet, and rebroadcast, during a second set of one or more master slots of the periodic broadcast window, the first Bluetooth packet based on the one or more NACK signals.

Some examples of the method, apparatuses, and non-transitory computer-readable medium described herein may further include operations, features, means, or instructions for performing one or more received signal strength indication (RSSI) measurements during a second set of one or more slave slots of the periodic broadcast window, determining, based on the one or more RSSI measurements during the second set of one or more slave slots, that no receiving devices may have transmitted a NACK signal corresponding to the first Bluetooth packet, and broadcasting, during a third set of one or more master slots of the periodic broadcast window, a second Bluetooth packet based on the determining.

Some examples of the method, apparatuses, and non-transitory computer-readable medium described herein may further include operations, features, means, or instructions for broadcasting a null Bluetooth packet over the channel bandwidth during a first master slot of a third set of one or more master slots of the periodic broadcast window, and broadcasting a third Bluetooth packet over the channel bandwidth during a fourth set of one or more master slots of the periodic broadcast window, where the third set of one or more master slots and the fourth set of one or more master slots include the same number of master slots, and where the third Bluetooth packet may be broadcast after a duration of the third set of one or more master slots and a third set of one or more slave slots.

Some examples of the method, apparatuses, and non-transitory computer-readable medium described herein may further include operations, features, means, or instructions for detecting energy on a first frequency, a second frequency, or both a first frequency and a second frequency, from a first receiving device based on the one or more RSSI measurements, where receiving the one or more NACK signals may be based on detecting energy on the first frequency, the second frequency, or both the first frequency and the second frequency.

Some examples of the method, apparatuses, and non-transitory computer-readable medium described herein may further include operations, features, means, or instructions for identifying a flushing timeout, determining that the flushing timeout may have expired, and performing a flushing procedure based on the identifying and the determining.

Some examples of the method, apparatuses, and non-transitory computer-readable medium described herein may further include operations, features, means, or instructions for performing one or more of a band scan, a synchronization procedure, or adding a new receiving device to a set of one or more receiving devices, during a periodic idle window.

Some examples of the method, apparatuses, and non-transitory computer-readable medium described herein may further include operations, features, means, or instructions for broadcasting the first Bluetooth packet occurs during a first occurrence of the periodic broadcast window, and where rebroadcasting the first Bluetooth packet occurs during a second occurrence of the periodic broadcast window subsequent to the first occurrence of the periodic broadcast window.

In some examples of the method, apparatuses, and non-transitory computer-readable medium described herein, the periodic broadcast window may have a configurable duration based on latency requirements for the channel bandwidth.

In some examples of the method, apparatuses, and non-transitory computer-readable medium described herein, the first Bluetooth packet includes a sequence number including one or more bits.

A method of wireless communications including is described. The method may include monitoring a channel bandwidth for a first Bluetooth packet during a first set of one or more master slots of a periodic broadcast window, generating, based on a failure to receive the first Bluetooth packet, a sequence of bits based on the monitoring, transmitting, based on the generated sequence of bits, one or more NACK signals for the first Bluetooth packet in a set of one or more slave slots subsequent to the first set of one or more master slots of the periodic broadcast window, and receiving, based on the NACK signal, the first Bluetooth packet during a second set of one or more master slots of the periodic broadcast window.

An apparatus for wireless communications including is described. The apparatus may include a processor, memory in electronic communication with the processor, and instructions stored in the memory. The instructions may be executable by the processor to cause the apparatus to monitor a channel bandwidth for a first Bluetooth packet during a first set of one or more master slots of a periodic broadcast window, generate, based on a failure to receive the first Bluetooth packet, a sequence of bits based on the monitoring, transmit, based on the generated sequence of bits, one or more NACK signals for the first Bluetooth packet in a set of one or more slave slots subsequent to the first set of one or more master slots of the periodic broadcast window, and receive, based on the NACK signal, the first Bluetooth packet during a second set of one or more master slots of the periodic broadcast window.

Another apparatus for wireless communications including is described. The apparatus may include means for monitoring a channel bandwidth for a first Bluetooth packet during a first set of one or more master slots of a periodic broadcast window, generating, based on a failure to receive the first Bluetooth packet, a sequence of bits based on the monitoring, transmitting, based on the generated sequence of bits, one or more NACK signals for the first Bluetooth packet in a set of one or more slave slots subsequent to the first set of one or more master slots of the periodic broadcast window, and receiving, based on the NACK signal, the first Bluetooth packet during a second set of one or more master slots of the periodic broadcast window.

A non-transitory computer-readable medium storing code for wireless communications including is described. The code may include instructions executable by a processor to monitor a channel bandwidth for a first Bluetooth packet during a first set of one or more master slots of a periodic broadcast window, generate, based on a failure to receive the first Bluetooth packet, a sequence of bits based on the monitoring, transmit, based on the generated sequence of bits, one or more NACK signals for the first Bluetooth packet in a set of one or more slave slots subsequent to the first set of one or more master slots of the periodic broadcast window, and receive, based on the NACK signal, the first Bluetooth packet during a second set of one or more master slots of the periodic broadcast window.

Some examples of the method, apparatuses, and non-transitory computer-readable medium described herein may further include operations, features, means, or instructions for transmitting a first NACK signal of the one or more NACK signals over a first frequency, and transmitting a second NACK signal of the one or more NACK signals over a second frequency.

Some examples of the method, apparatuses, and non-transitory computer-readable medium described herein may further include operations, features, means, or instructions for refraining from transmitting one or more NACK signals subsequent to the second set of one or more master slots based on receiving the first Bluetooth packet during the second set of one or more master slots of the periodic broadcast window.

Some examples of the method, apparatuses, and non-transitory computer-readable medium described herein may further include operations, features, means, or instructions for receiving a second Bluetooth packet during a third set of one or more master slots of the periodic broadcast window, initiating reception of the second Bluetooth packet during a fourth set of one or more master slots of the periodic broadcast window, identifying a sequence number including one or more bits based on the initiated reception, determining that the second Bluetooth packet may have been successfully received in a prior set of one or more master slots of the periodic broadcast window, and aborting continued reception of the second Bluetooth packet based on the identified sequence number and the determining.

Some examples of the method, apparatuses, and non-transitory computer-readable medium described herein may further include operations, features, means, or instructions for performing one or more of a band scan, a synchronization procedure, or adding a new receiving device to a group of one or more receiving devices, during a periodic idle window.

In some examples of the method, apparatuses, and non-transitory computer-readable medium described herein, the first set of one or more master slots may be located in a first occurrence of the periodic broadcast window, and where the second set of one or more master slots may be located during a second occurrence of the periodic broadcast window subsequent to the first occurrence of the periodic broadcast window.

In some examples of the method, apparatuses, and non-transitory computer-readable medium described herein, the periodic broadcast window may have a configurable duration based on latency requirements for the channel bandwidth.

DETAILED DESCRIPTION

In some examples, a Bluetooth system may send broadcast communications, and may send on-demand retransmissions to address packet reception failures. A whole channel bandwidth may be divided into two recurring periodic windows: a broadcast window and an idle window. During the broadcast window, a broadcasting device may send data packets. In some examples, all receivers may be expected to listen to the broadcaster during the broadcast window. The broadcaster may transmit or retransmit each data packet based on negative acknowledgement (NACK) signals received from any one of the receiving devices. That is, if no NACK signal is received from any receiving device, then the broadcasting device may transmit a second packet. However, if any one of the receiving devices transmits a NACK signal during a slave slot following the transmission of the first packet, then the broadcasting device may retransmit the first packet. During the idle window, broadcasting and receiving devices may perform other independent activities (e.g., band scanning, synchronization train procedures, procedures for adding new receivers into the broadcast network, and the like).

Aspects of the disclosure are initially described in the context of a wireless communications system. Aspects of the disclosure are further illustrated by and described with reference to periodic bandwidth configurations, broadcast windows, and packet header structures. Aspects of the disclosure are further illustrated by and described with reference to apparatus diagrams, system diagrams, and flowcharts that relate to on-demand retransmissions in broadcast communication.

Figure 1:
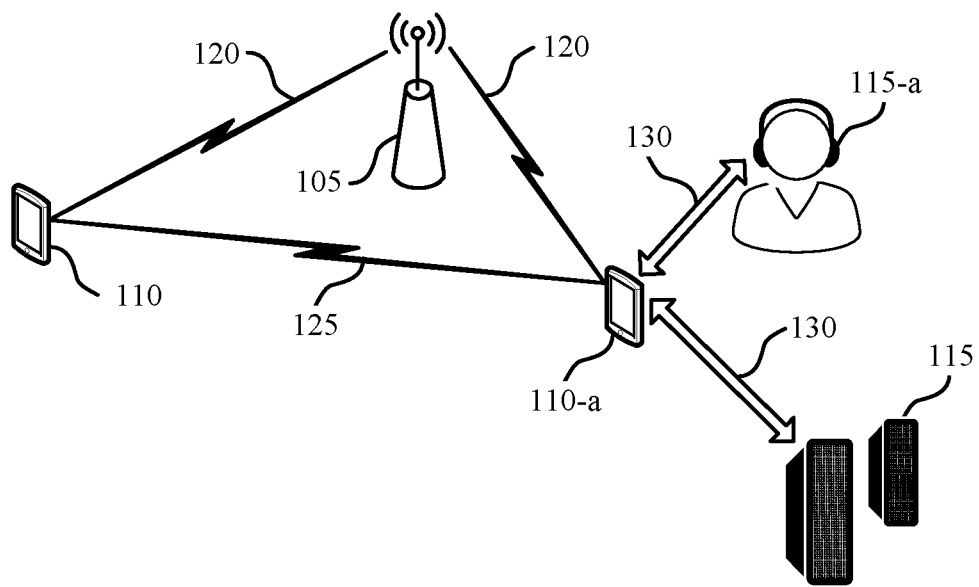
FIG. 1 illustrates an example of a system that supports on-demand retransmissions in broadcast communication in accordance with aspects of the present disclosure.

FIG. 1 illustrates a system 100 (e.g., which may refer to or include a wireless personal area network (PAN), a wireless local area network (WLAN), a Wi-Fi network, or any combination thereof) configured in accordance with various aspects of the present disclosure. The system 100 may include an access point (AP) 105, devices 110, and paired devices (e.g., receiving devices 115) implementing WLAN communications (e.g., Wi-Fi communications) and/or Bluetooth communications. For example, devices 110 may include cell phones, mobile stations, personal digital assistant (PDAs), other handheld devices, netbooks, notebook computers, tablet computers, laptops, or some other suitable terminology. Paired devices (e.g., receiving devices 115) may include Bluetooth devices capable of pairing with other Bluetooth devices (e.g., such as devices 110), which may include wireless headsets, speakers, ear pieces, headphones, display devices (e.g., TVs, computer monitors), microphones, meters, valves, etc.

Bluetooth communications may refer to a short-range communication protocol and may be used to connect and exchange information between devices (e.g., broadcasting device 110) and paired devices (e.g., receiving device 115) (e.g., between mobile phones, computers, digital cameras, wireless headsets, speakers, keyboards, mice or other input peripherals, and similar devices). Bluetooth systems (e.g., aspects of system 100) may be organized using a master-slave relationship employing a time division duplex protocol having, for example, defined time slots of 625 mu secs, in which transmission alternates between the master device (e.g., a broadcasting device 110) and one or more slave devices (e.g., receiving devices 115). In some cases, a broadcasting device 110 may generally refer to a master device, and a receiving device 115 may generally refer to a paired device, which may be a slave device in a PAN. As such, in some cases, a device may be referred to as either a device 110 or a paired device 115 based on the Bluetooth role configuration of the device. That is, designation of a device as either a broadcasting device 110 or a receiving device 115 may not necessarily indicate a distinction in device capability, but rather may refer to or indicate roles held by the device in the PAN. Generally, broadcasting device 110 may refer to a wireless communication device capable of wirelessly exchanging data signals with another device, and receiving device 115 may refer to a device operating in a slave role, or to a short-range wireless device capable of exchanging data signals with the mobile device (e.g., using Bluetooth communication protocols).

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., device 110-a) implements an audio source device (SRC) role and another device (e.g., paired device 115-a) implements an audio sink device (SNK) role.

For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth speakers) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior, etc.). The Bluetooth protocol stack is split in two parts: a "controller stack" containing the timing critical radio interface, and a "host stack" dealing with high level data. The controller stack is generally implemented in a low cost silicon device containing the Bluetooth radio and a microprocessor. The controller stack may be responsible for setting up links 130 such as asynchronous connection-less (ACL) links, synchronous connection orientated (SCO) links, etc. Further, the controller stack may implement link management protocol (LMP) functions, low energy link layer (LE LL) functions, etc. The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A link 130 established between two Bluetooth devices (e.g., between a broadcasting device 110-a and a receiving device 115-a) may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., receiving device 115-a) are acknowledged, and may be retransmitted if not acknowledged during a retransmission window. In addition, audio may be streamed between the broadcasting device 110-a and receiving device 115-a using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some cases, a device may be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a device 110 may support WLAN communications via AP 105 (e.g., over communication links 120). The AP 105 and the associated devices 110 may represent a basic service set (BSS) or an extended service set (ESS). The various devices 110 in the network may be able to communicate with one another through the AP 105. In some cases the AP 105 may be associated with a coverage area, which may represent a basic service area (BSA).

Devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100. AP 105 may be coupled to a network, such as the Internet, and may enable a device 110 to communicate via the network (or communicate with other devices 110 coupled to the AP 105). A device 110 may communicate with a network device bi-directionally. For example, in a WLAN, a device 110 may communicate with an associated AP 105 via downlink (e.g., the communication link from the AP 105 to the device 110) and uplink (e.g., the communication link from the device 110 to the AP 105).

In some examples, content, media, audio, etc. exchanged between a device 110 and a receiving device 115 may originate from a WLAN. For example, in some cases, device 110-a may receive audio from an AP 105 (e.g., via WLAN communications), and the device 110-a may then implement the described techniques to relay or pass the audio to the receiving device 115-a (e.g., via Bluetooth communications). In some cases, certain types of Bluetooth communications (e.g., such as high quality or high definition (HD) Bluetooth) may require enhanced quality of service. For example, in some cases, delay-sensitive Bluetooth traffic may have higher priority than WLAN traffic.

In some examples, a broadcasting device 110 may send broadcast transmissions to one or more receiving devices 115. As described above, broadcasting device 110 may be referred to as a device, a transmitting device, a broadcaster, a master device, or the like. Receiving device 115 may be referred to as a slave device, a receiver, a paired device, or the like. Broadcasting devices 110 and receiving devices 115 may utilize a Bluetooth communication protocol (e.g., DH5, 2-DH5, 3-DH5, etc.), and may broadcast one or more data packets during one or more master slots (e.g., 1 master slot, three master slots, five master slots, etc.). A receiving device 115 may receive the broadcast master slot or master slots, and may respond with an acknowledgement (ACK) or negative acknowledgement (NACK) signal during one or more slave slots (e.g., one slave slot, three slave slots, five slave slots, etc.). In some examples of Bluetooth communications, a typical packet error rate may be, for example, 5%. In such examples, a receiver may receive a first transmission of one or more data packets correctly the first time 95% of the time. However, to address the packet error that may occur for only 5% of all traffic, all traffic may be retransmitted multiple times. For instance, if a single packet in a string of packets is unsuccessfully received, the entire string of packets may be retransmitted. These multiple retransmissions may cost a significant amount of bandwidth and may result in unnecessarily high throughput. For example, if the number of retransmissions is two, then an overall bandwidth requirement may be three times the audio rate. Additionally, in cases where the transmissions and retransmissions are performed over periodic intervals, system latency may increase. In cases where transmissions are repeated using, for instance, erasure encoding, latency may be increased even more.

To improve system efficiency and decrease system latency, a broadcasting device 110 may send broadcast communications, and may send on-demand retransmissions to address packet reception failures. A whole channel bandwidth may be divided into two recurring periodic windows: a broadcast window and an idle window, as described in greater detail with respect to FIG. 2. During the broadcast window, a broadcasting device 110 may send data packets. In some examples, all receivers may be required to listen to the broadcasting device 110 during the broadcast window. The broadcasting device 110 may transmit or retransmit each data packet based on NACK signals received from any one of the receiving devices, as described in greater detail with respect to FIG. 3. That is, if no NACK signal is received from any receiving device 115, then the broadcasting device 110 may transmit a second packet. However, if any one of the receiving devices 115 transmits a NACK signal during a slave slot following the transmission of the first packet, then the broadcasting device 110 may retransmit the first packet. During the idle window, broadcasting devices 110 and receiving devices 115 may perform other independent activities (e.g., band scanning, synchronization train procedures, procedures for adding new receivers into the broadcast network, and the like).

Figure 2:
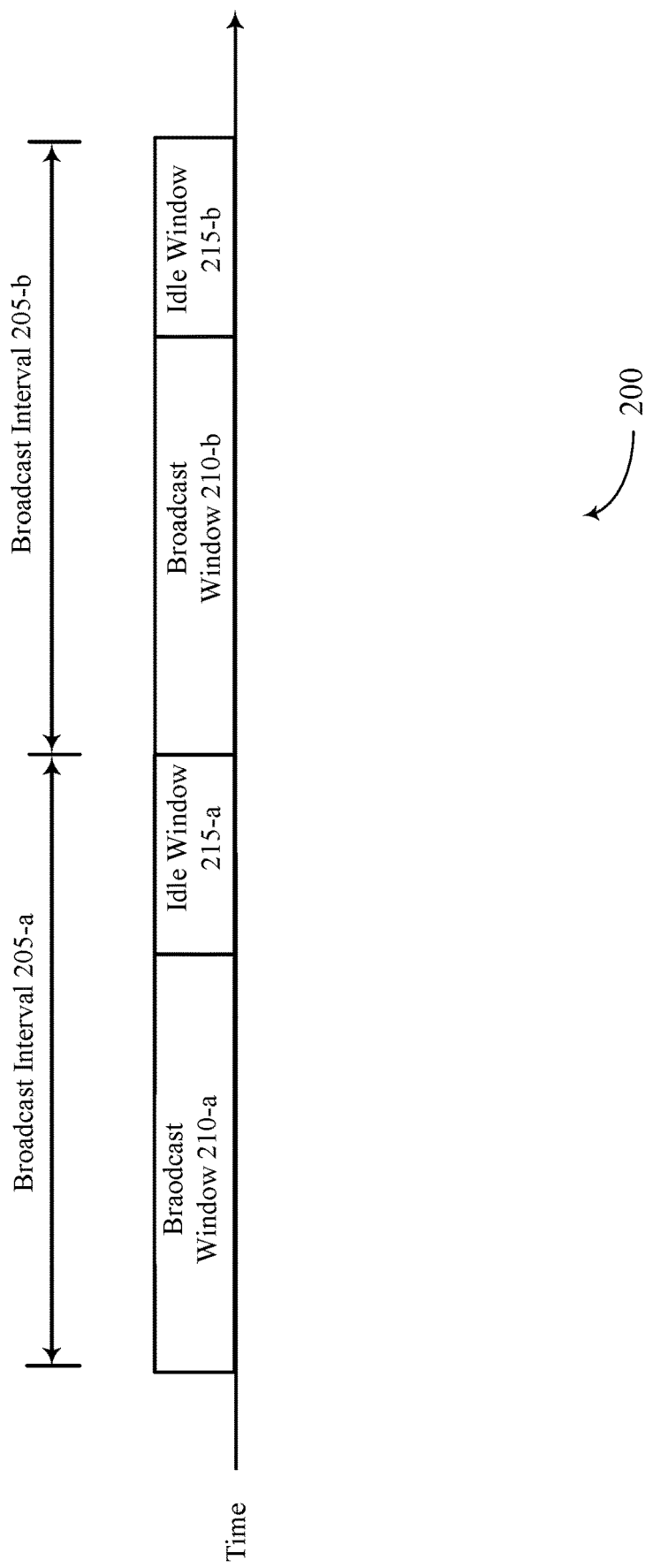
FIG. 2 illustrates an example of a periodic bandwidth configuration that supports on-demand retransmissions in broadcast communication in accordance with aspects of the present disclosure.

FIG. 2 illustrates an example of a periodic bandwidth configuration 200 that supports on-demand retransmissions in broadcast communication in accordance with aspects of the present disclosure. In some examples, periodic bandwidth configuration 200 may implement aspects of system 100. The periodic bandwidth configuration may apply to broadcasting devices and receiving devices, as described with respect to system 100.

In some examples, an entire channel bandwidth may be divided into recurring broadcast intervals 205. Each broadcast interval 205 may be divided into two periodic parts: a broadcast window 210 and an Idle window 215.

A broadcasting device (e.g. a broadcasting device 110) may transmit packets during broadcast windows 210. All receiving devices (e.g., receiving devices 115) may be required to listen for broadcast transmissions and retransmissions from the broadcasting device during the broadcast window 210. One or more receiving devices may send NACK signals after failed transmissions of individual packets, and the broadcasting device may perform a retransmission based on the received NACK signals. The broadcasting device may send the retransmission based on even a single NACK signal from any one of the receiving devices. In some examples, transmissions or retransmission may occur across broadcast windows 210. For instance, a broadcasting device may send a packet to one or more receiving devices during broadcast window 210-a. One of the receiving devices may transmit a NACK signal during a final portion of broadcast window 210-a, and there may not be sufficient time remaining in broadcast window 210-a to retransmit the packet. In such examples, the broadcasting device may perform a retransmission of the packet during broadcast window 210-b of broadcast interval 205-b, after idle window 215-a and prior to idle window 215-b. Transmission and retransmission procedures during the broadcast windows 210 are described in greater detail with respect to FIG. 2.

During the idle window 215, the broadcasting device and the receiving devices may perform other independent activities. For example, one or more devices may perform band scans, synchronization train procedures, new receiving devices may be added to the broadcast network, and the like.

In some examples, a broadcast interval 205 may be configurable. The duration of broadcast interval 205-a may depend on latency requirements. For example, broadcast window 210 and idle window 215 size may depend on throughput requirements. A higher throughput requirement may result in a longer broadcast window 210. For instance, if an idle window is 30 ms and a maximum number of expected transmissions of 2-DH5 packets are 10 (one transmission and nine retransmissions) then overall OTA latency may be (10×3.75)+30 ms=67.5 ms. By configuring the idle window size and a flush timeout (as described in greater detail with respect to FIG. 3) required maximum latency may be achieved.

A maximum achievable throughput may depend upon a ratio of idle window 215 size to broadcast window 210 size, and an average number of transmissions per packet. For instance, if an idle window size is equal to ten percent of the broadcast interval, and an average number of transmissions per packets equal to 1.3 (e.g., thirty percent retransmissions) then a maximum broadcast throughput may be equal to $$(100 - 10) \times \left(\text{maximum } tyheoretical \frac{\text{throughput}}{130}\right).$$

For a typical 2-DH5 packet (maximum theoretical throughput of 1414 kbps), a maximum broadcast throughput of 9801 kbps may be achieved.

A broadcast interval 205 and the duration of broadcast windows 210 and idle windows 215 may be dynamically configured, or preconfigured. A network device may indicate to a broadcasting device 110, and the broadcasting device 110 may indicate to a receiving device 115, a broadcast interval configuration. Alternatively, a broadcasting device 110 and receiving devices 115 may be preconfigured with the broadcast interval configuration.

Figure 3:
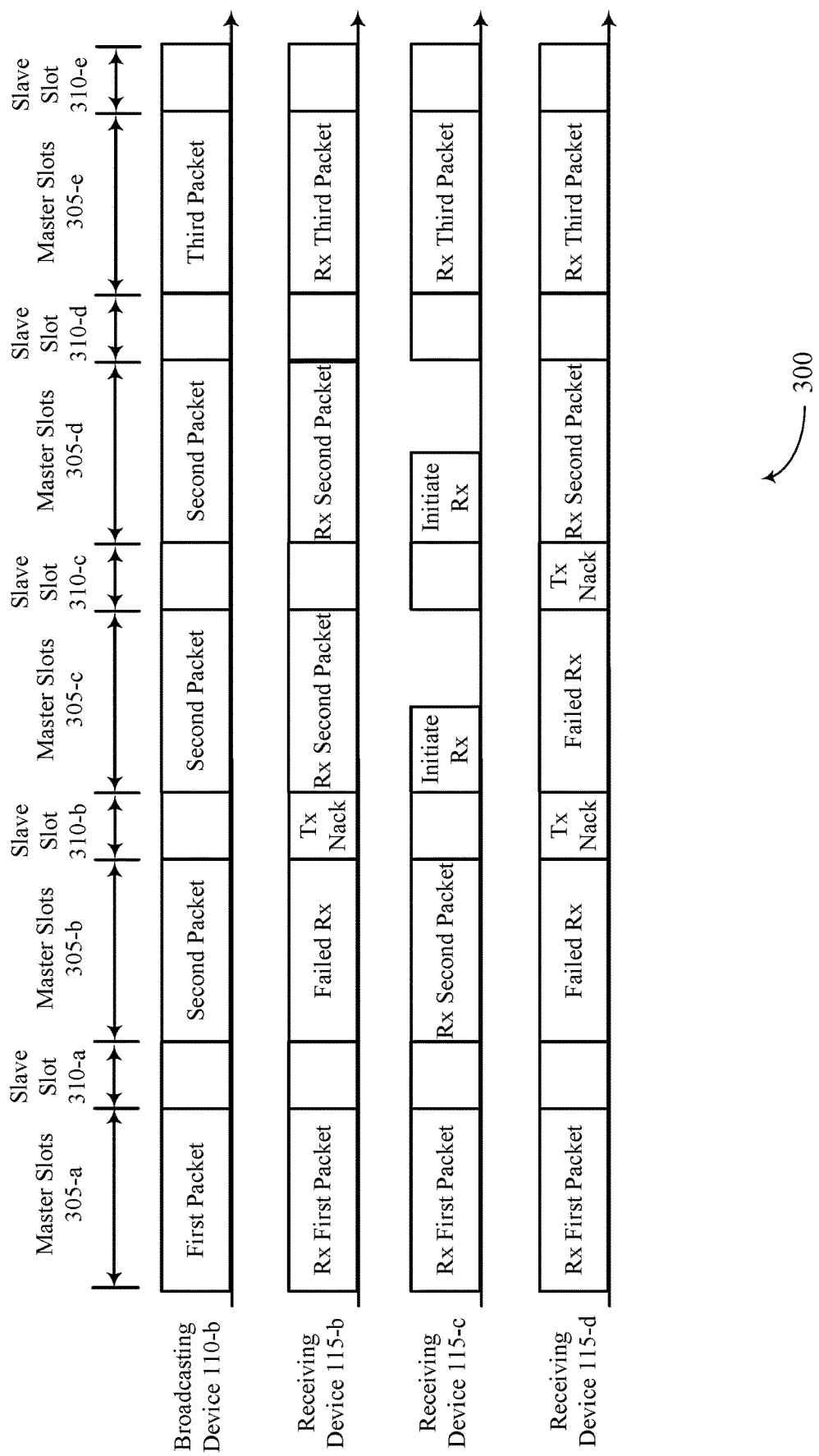
FIG. 3 illustrates an example of a broadcast window that supports on-demand retransmissions in broadcast communication in accordance with aspects of the present disclosure.

FIG. 3 illustrates an example of a broadcast window 300 that supports on-demand retransmissions in broadcast communication in accordance with aspects of the present disclosure. In some examples, broadcast window 300 may implement aspects of wireless 100. The broadcast window 300 may apply to broadcasting devices and receiving devices, as described with respect to system 100.

In some examples, broadcasting device 110-b may have data to send to receiving devices 115. The broadcasting device 110-b may communicate by sending broadcast messages during one or more even slots (e.g., master slots 305). Master slot 305 may include one or more master slots (e.g., one master slot, three master slots, five master slots, etc.). Broadcast packets may be configured according to a predetermined, fixed packet. Any receiving device 115 may send a NACK transmission during one or more slave slots 310 (e.g. one slave slot, three slave slots, five slots, etc.) if a broadcast packet is not successfully received. In the example illustrated in FIG. 3, master slots 305 may include, for example, five slots, and slave slots 310 may include one slot.

During master slots 305-a, broadcasting device 110-b may determine that it has data to send, and may broadcast a first packet. The first packet may be transmitted during, for example, five slots of master slots 305-a. Receiving device 115-b, receiving device 115-c, and receiving device 115-d may successfully receive the first packet. Have successfully received the first packet, none of receiving device 115-b, receiving device 115-c or receiving device 115-d may transmit a NACK signal during slave slot 310-a. Broadcasting device 110-b may monitor for NACK signals on one or more frequency channels. For instance, broadcasting device 110-b may perform energy detection during slave slot 310-a. For example, broadcasting device 110-b may perform one or more RSSI measurements on one or more channels. Upon determining that no NACK signal has been sent by any receiving device 115 (e.g., not detecting any energy on any of the measured channels), broadcasting device 110-b may determine to send a second packet.

In some examples, broadcasting device 110-b may determine that it does not have any data to send, and may transmit a null packet during a first slot of master slot 305-a. Broadcasting device 110-b may wait a predetermined amount of time before sending another packet (e.g., a second packet) after sending a null packet. For instance, broadcasting device 110-b may send a null packet during a first slot of master slots 305-a. If master slots 305-a include five slots, then broadcasting device 110-b may wait for five slots plus the number of slave slots included in slave slot 310-a (e.g., one slot). Thus, broadcasting device 110-b may wait a total of six slots (e.g., five master s lots and one slave slot for 2-DH5 protocol) to send another transmission (e.g., another null packet or a data packet) during master slots 305-b.

During master slots 305-b, broadcasting device 110-b may broadcast a second packet. Master slots 305-b. Receiving device 115-c may successfully receive the second packet, and may refrain from taking any action during slave slot 310-b. However, receiving device 1150-b and receiving device 115-d may fail to receive the second packet. Receiving device 115-c may not send any signal during slave slot 310-b. However, receiving device 115-b may transmit a NACK signal during slave slot 310-b, and receiving device 115-d may also transmit a NACK signal during slave slot 310-b.

NACK signals may be transmitted according to broadcaster packet size. In some examples, receiving device 115-b may monitor for a broadcast transmission during master slots 305-b. Receiving device 115-b may not receive or detect any portion of the second packet. However, receiving device 115-b may be configured to know the broadcaster packet size (e.g., five master slots for 2 DH5 protocol). When receiving device 115-b does not receiving any signal during any of the five slots of master slots 305-b, receiving device 115-b may transmit a NACK signal during slave slot 310-b. Receiving device 115-b may fail to receive the second packet during a first slot of master slots 305-b. However, based on the broadcaster packet size, receiving device 115-b may wait the full five s lots of master slots 305-b to transmit the NACK s signal during slave slot 310-b, to avoid corruption or interference with the broadcast second packet. Receiving devices 115 may transmit NACK signals at a maximum allowed power.

A receiving device 115 may transmit a NACK signal that is a sequence of bits. The sequence of bits may be random, and may be of a configurable length. The NACK signal may not contain any access address or other header or footer. The broadcasting device 110-b may detect the random sequence of bits by performing RSSI measurements. In some examples, the RSSI detection may successfully detect NACK signaling even where multiple receiving devices 115 transmit NACK signals. Because the NACK sequences include random sequences of bits, it may be unlikely that the phases of two transmitted NACK signals will be opposite, and broadcasting device 110-*b* may be able to detect NACK signaling even where multiple NACK signals are transmitted (e.g., a NACK signal from receiving device 115-*b* and a NACK signal from receiving device 115-*d* during slave slot 310-*b*).

A receiving device 115 may transmit a single NACK signal on a single channel, or multiple NACK signals on multiple channels. For example, receiving device 115-*b* and receiving device 115-*d* may each transmit one NACK signal one respective channels during slave slot 310-*b*. In some examples, Alternatively, receiving device 115-*b* may transmit multiple (e.g., two) NACK signals on multiple (e.g., two) different channels. In some examples, a receiving device 115 may transmit a first NACK signal on a first frequency during a first portion of a slave slot 310, and a second NACK signal on a second frequency during a second portion of a slave slot. In some examples, the first and second NACK signals may be transmitted before and after a slot-portion boundary (e.g., a half-slot boundary). Channels on which NACK signals are transmitted may be configurable.

Broadcasting device 110-*b* may consider a NACK signal received if even one NACK signal is detected on even one channel. For instance, broadcasting device 110-*b* may perform RSSI measurements on multiple channels during slave slots 310, and may detect only one NACK signal transmitted by receiving device 115-*b* on one channel. Upon detecting the one NACK signal, broadcasting device 110-*b* may consider a NACK signal received and may retransmit the second packet during master slots 305-*c*. This may be beneficial where channel quality is poor, or where transmit power from a receiving device 115 is low (e.g., the receiving device 115 is located far from broadcasting device 110-*b*, or where transmission power is limited) and NACK signals on one or more channels are more difficult to detect.

In some examples, broadcasting device 110-*b* may only consider a NACK signal received if multiple NACK signals are received one multiple channels. Multiple channels may be spaced so that they fall within different Wi-Fi channels. For example, if receiving device 115-*b* sends two NACK signals on two channels, but broadcasting device 110-*b* only detects energy on one of the channels during slave slot 310-*b*, then broadcasting device 110-*b* may determine that no NACK signal has been received. If the broadcasting device 110-*b* detects energy on multiple channels (e.g., both frequencies), then broadcasting device 110-*b* may consider the NACK signal received. This may be beneficial where an available system bandwidth is congested and false positives are common (e.g., where broadcasting device 110-*b* might detect energy during slave slot 310 that was not intended to be a NACK signal from a receiving device 115). By requiring that multiple NACK signals be detected on multiple frequencies that fall within different Wi-Fi channels Wi-Fi noise or interference may be treated as one of multiple required NACK signals, and the probability of detecting false NACK signals may be reduced.

If the broadcasting device 110-*b* receives even one NACK signal (e.g., detects energy during an RSSI measurement) then the broadcasting device 110-*b* may retransmit the data packet. Upon receiving the NACK signals from receiving device 115-*b* and receiving device 115-*d*, broadcasting device 110-*b* may retransmit the second packet during master slots 305-*c*. Receiving device 115-*b* may successfully receive the second packet during master slots 305-*c*. However, receiving device 115-*d* may fail to receive the second packet a second time. Receiving device 115-*d* may transmit a NACK signal during slave slot 310-*c*. Upon receiving the one transmitted NACK signal during slave slot 310-*c*, broadcasting device 110-*b* may retransmit the second packet again during master slots 305-*d*. Receiving device 115-*d* may receiving the second packet during master slots 305-*d*, and may refrain from sending any transmission or taking any action during the subsequent slave slot 310-*d*. Broadcasting device 110-*b* may performing one or more RSSI procedures (e.g., before and after mid-slot boundaries, or on multiple frequencies within different channels) and may not detect any energy. Broadcasting device 110-*b* may determine that no receiving device 115 has transmitted a NACK signal, and may transmit a third packet during master slots 305-*e*. Broadcasting device 110-*b* may similarly broadcast subsequent packets if it does not detect any NACK signaling during slave slot 310-*e*.

Figure 4:
FIG. 4 illustrates an example of a packet header structure that supports on-demand retransmissions in broadcast communication in accordance with aspects of the present disclosure.

In some examples, a broadcast packet may include a sequence number, as described in greater detail with respect to FIG. 4. A receiving device 115 may utilize the sequence number to perform an early abort procedure if it is receiving a packet it has already successfully received. For example, receiving device 115-*c* may support early abort procedures. Receiving device 115-*c* may successfully receive the first packet during master slots 305-*a*, and may decode the sequence number for the first packet. Receiving device 115-*c* may also successfully receive the second packet during master slots 305-*b*, and may decode the sequence number for the second packet. During master slots 305-*c*, receiving device 115-*c* may initiate reception of the broadcast second packet. Upon receiving a portion of the second packet, receiving device 115-*c* may decode and identify the sequence number for the second packet. Based on the identified sequence number, receiving device 115-*c* may determine that it has already received the second packet, and may perform an early abort procedure to cease reception of the second packet during master slots 305-*c*. Similarly, during master slots 305-*d*, receiving device 115-*c* may identify the same sequence number for the second packet, and perform another early abort procedure. Upon receiving the third packet during master slot 305-*e*, receiving device 115-*c* may identify another sequence number for the third packet, and may receive the entirety of the third packet. By avoiding repetitive reception of packets that have already been successfully received, a receiving device 115-*c* may conserve power. Other devices may not support early abort procedures. For instance, receiving device 115-*b* may not be capable of performing early abort procedures. Instead, receiving device 115-*b* may receiving the entirety of the second packet a second time during maser slots 305-*d*.

In some examples, broadcasting device 110-*b* may perform a flushing operation on one or more broadcast packets. For example, if a receiving device repeatedly fails to receive a packet and repeatedly sends NACK signals, then continued transmission of subsequent packets could be delayed indefinitely. To avoid this case, a broadcasting device 110 may flush current broadcast packets after a flush timeout. That is, if a packet is retransmitted for an amount of time greater than a flush timeout (e.g., a threshold amount of time), then broadcasting device 110-*b* may cease retransmission and reinitiate transmission of data. The flush timeout may be configurable, and may be based on a maximum latency requirement. In some examples, the flush timeout may be greater than the flush timeout used for advanced audio distribution profile (A2DP) communications. The extended flush timeout value may allow for more retransmissions due to a large number of receiving devices 115 or false NACK signals.

In some examples, latency may be similar to A2DP packet communications. The presence of false NACK signals and multiple receiving devices 115 may increase the number of retransmissions of packets, but such increased retransmissions may increase the maximum latency by a small amount (e.g., a few milliseconds). Receiving devices (e.g., slave devices) may be required to listen and be present during a broadcast window, so uncertainly of communication between broadcasting devices and receiving devices may be removed.

By performing on-demand retransmissions, a Bluetooth system may increase efficiency and decrease unnecessary retransmissions and system latency.

FIG. 4 illustrates an example of a packet header structure 400 that supports on-demand retransmissions in broadcast communication in accordance with aspects of the present disclosure. In some examples, packet header structure 400 may implement aspects of system 100. Packet header structure 400 may sent by a broadcasting devices to one or more receiving devices, as described with respect to FIGS. 1-3.

In some examples, a Bluetooth packet header may be configured to include a packet sequence number. For example, a packet header may include a logical transport address (LT ADDR) field 405. LT ADDR field 405 may indicate a destination or a packet in a given slot or set of slots, and the source for the packet, and may include 3 bits. The Bluetooth packet header may also include a packet type 410. Packet type 410 may indicate which type of packet is being used in the broadcast transmission, and may include 4 bits. A packet header may include an header-error-check (HEC) field 420 to check header integrity. HEC field 420 may include 8 bits.

In some examples, multiple fields may be combined in a sequence field 415. Sequence field 415 may include, for example, a 3-bit unique packet sequence. Sequence field 415 may be used in place of or as a combination of a 1-bit flow field (used for flow control) a 1-bit automatic Repeat Request Number (ARQN) field (used for acknowledgement indication to inform the source of successful transfer of payload data) and a 1-bit sequence (SEQN) field (used for a sequential numbering scheme). The three bits from these three 1-bit fields may be repurposed to form a 3-bit sequence number in sequence field 415. The 3-bit sequence may be incremented by one for every new packet. The sequence number may be used for early abort procedures, as described with respect to FIG. 3. That is, if the new packet has the same sequence number as a previously successfully received packet, the receiving device 115 may abort the packet. The 3-bit sequence number may ensure that a receiver will not wrongly discard a fresh packet if it missed the previous packet.

Figure 5:
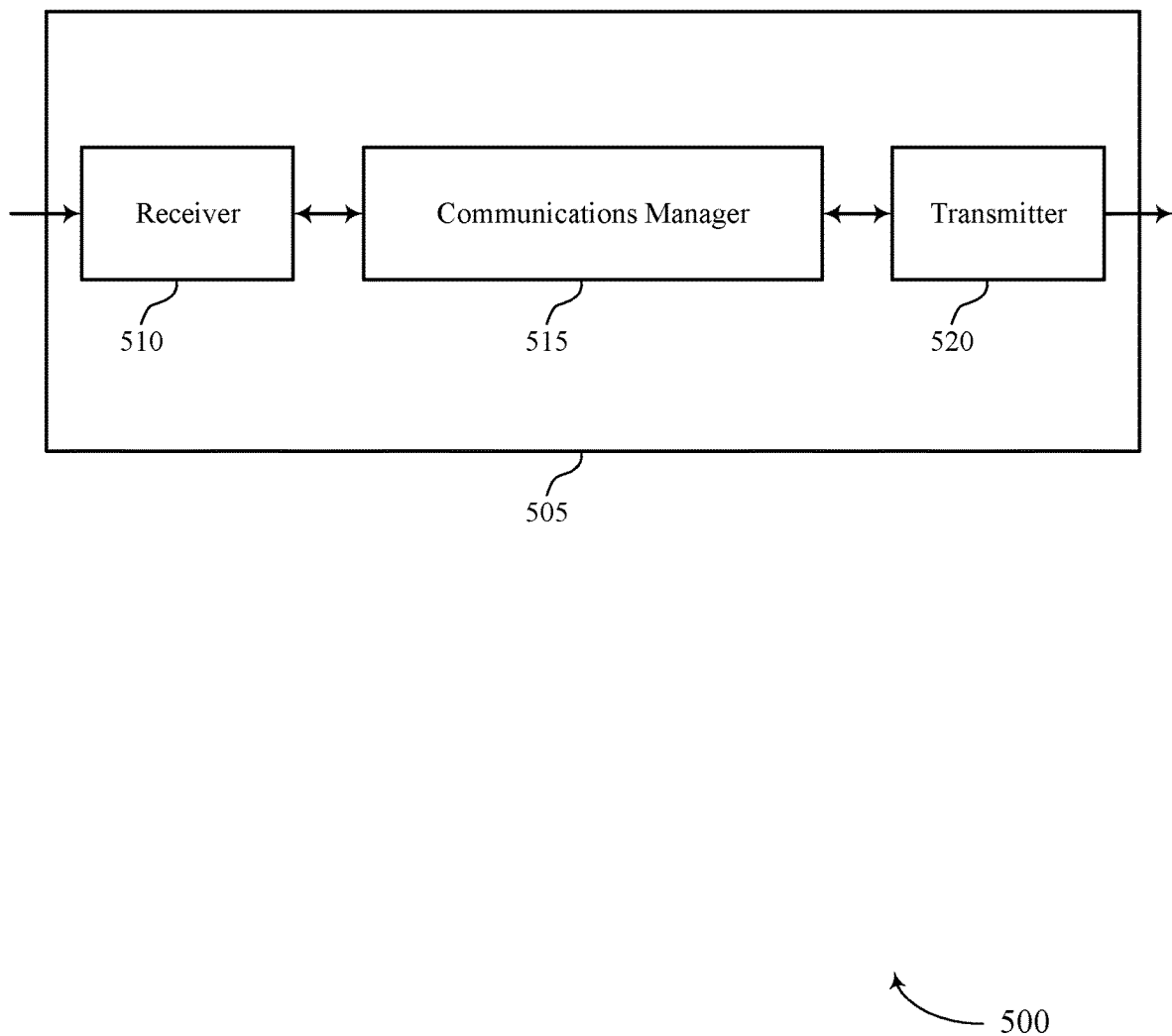
FIGS. 5 and 6 show block diagrams of devices that support on-demand retransmissions in broadcast communication in accordance with aspects of the present disclosure.

FIG. 5 shows a block diagram 500 of a device 505 that supports on-demand retransmissions in broadcast communication in accordance with aspects of the present disclosure. The device 505 may be an example of aspects of a device as described herein. For instance, the device 505 may be a broadcasting device or a receiving device. In some examples, device 505 may be both a broadcasting device in some cases and a receiving device in some cases, and may be capable of operating in either or both capacities. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to on-demand retransmissions in broadcast communication, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may broadcast a first Bluetooth packet over a channel bandwidth during a first set of one or more master slots of a periodic broadcast window, perform one or more received signal strength indication (RSSI) measurements during a first set of one or more slave slot of the periodic broadcast window, receive from one or more receiving devices, based on the one or more RSSI measurements, one or more NACK signals corresponding to the first Bluetooth packet, and rebroadcast, during a second set of one or more master slots of the periodic broadcast window, the first Bluetooth packet based on the one or more NACK signals. The communications manager 515 may also monitor a channel bandwidth for a first Bluetooth packet during a first set of one or more master slots of a periodic broadcast window, generate, based on a failure to receive the first Bluetooth packet, a sequence of bits based on the monitoring, transmit, based on the generated sequence of bits, one or more NACK signals for the first Bluetooth packet in a set of one or more slave slots subsequent to the first set of one or more master slots of the periodic broadcast window, and receive, based on the NACK signal, the first Bluetooth packet during a second set of one or more master slots of the periodic broadcast window. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
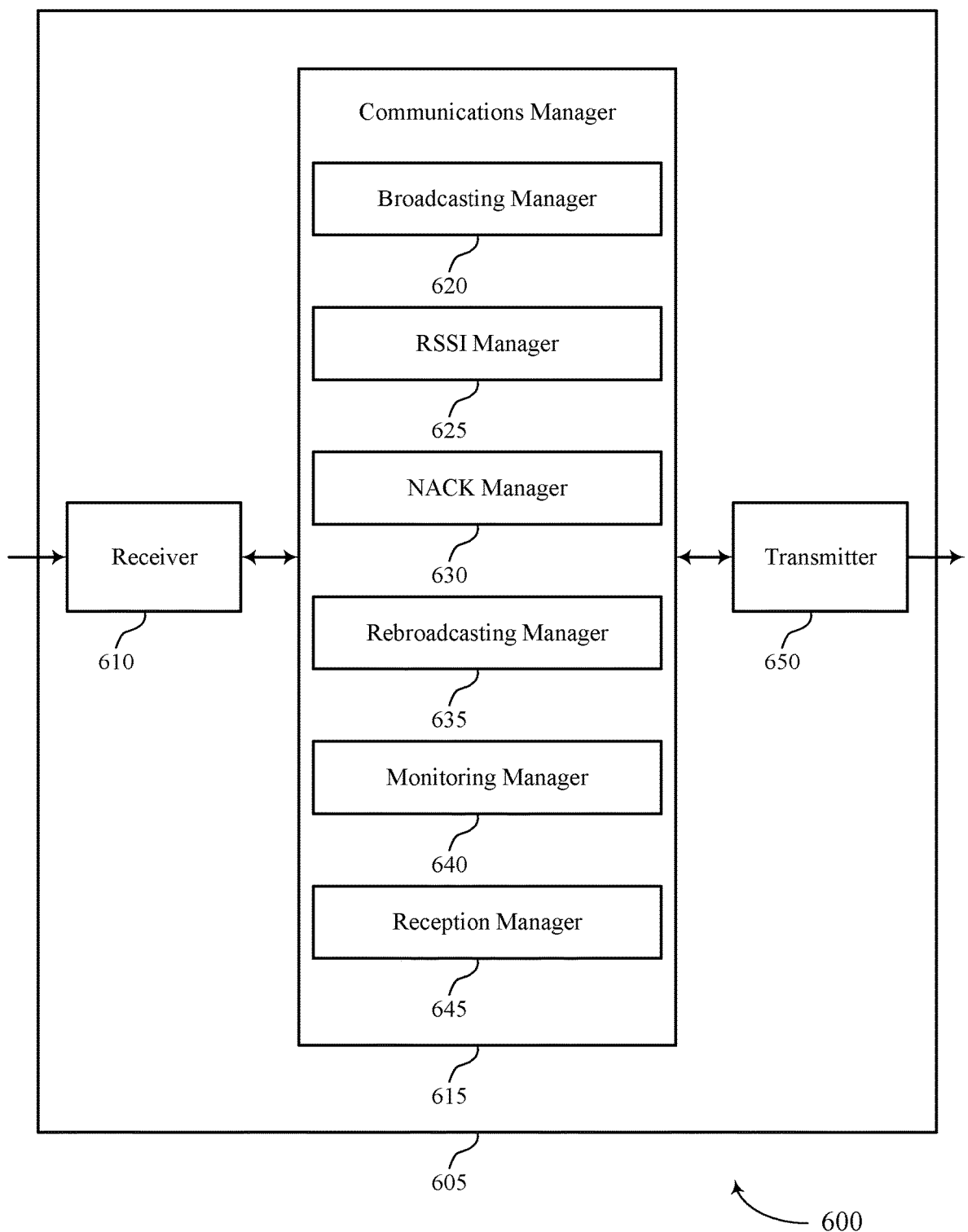

FIG. 6 shows a block diagram 600 of a device 605 that supports on-demand retransmissions in broadcast communication in accordance with aspects of the present disclosure. The device 605 may be an example of aspects of a device 605 or a device 115 as described herein. For instance, the device 605 may be a broadcasting device or a receiving device. In some examples, device 605 may be both a broadcasting device in some cases and a receiving device in some cases, and may be capable of operating in either or both capacities. The device 605 may include a receiver 610, a communications manager 615, and a transmitter 650. The device 605 may also include a processor. Each of these components may be in communication with one another (e.g., via one or more buses).

The receiver 610 may receive information such as packets, user data, or control information associated with various information channels (e.g., control channels, data channels, and information related to on-demand retransmissions in broadcast communication, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a broadcasting manager 620, a RSSI manager 625, a NACK manager 630, a rebroadcasting manager 635, a monitoring manager 640, and a reception manager 645. The communications manager 615 may be an example of aspects of the communications manager 810 described herein.

The broadcasting manager 620 may broadcast a first Bluetooth packet over a channel bandwidth during a first set of one or more master slots of a periodic broadcast window.

The RSSI manager 625 may perform one or more received signal strength indication (RSSI) measurements during a first set of one or more slave slot of the periodic broadcast window.

The NACK manager 630 may receive from one or more receiving devices, based on the one or more RSSI measurements, one or more NACK signals corresponding to the first Bluetooth packet.

The rebroadcasting manager 635 may rebroadcast, during a second set of one or more master slots of the periodic broadcast window, the first Bluetooth packet based on the one or more NACK signals.

The monitoring manager 640 may monitor a channel bandwidth for a first Bluetooth packet during a first set of one or more master slots of a periodic broadcast window.

The NACK manager 630 may generate, based on a failure to receive the first Bluetooth packet, a sequence of bits based on the monitoring and transmit, based on the generated sequence of bits, one or more NACK signals for the first Bluetooth packet in a set of one or more slave slots subsequent to the first set of one or more master slots of the periodic broadcast window.

The reception manager 645 may receive, based on the NACK signal, the first Bluetooth packet during a second set of one or more master slots of the periodic broadcast window.

The transmitter 650 may transmit signals generated by other components of the device 605. In some examples, the transmitter 650 may be collocated with a receiver 610 in a transceiver module. For example, the transmitter 650 may be an example of aspects of the transceiver 820 described with reference to FIG. 8. The transmitter 650 may utilize a single antenna or a set of antennas.

Figure 7:
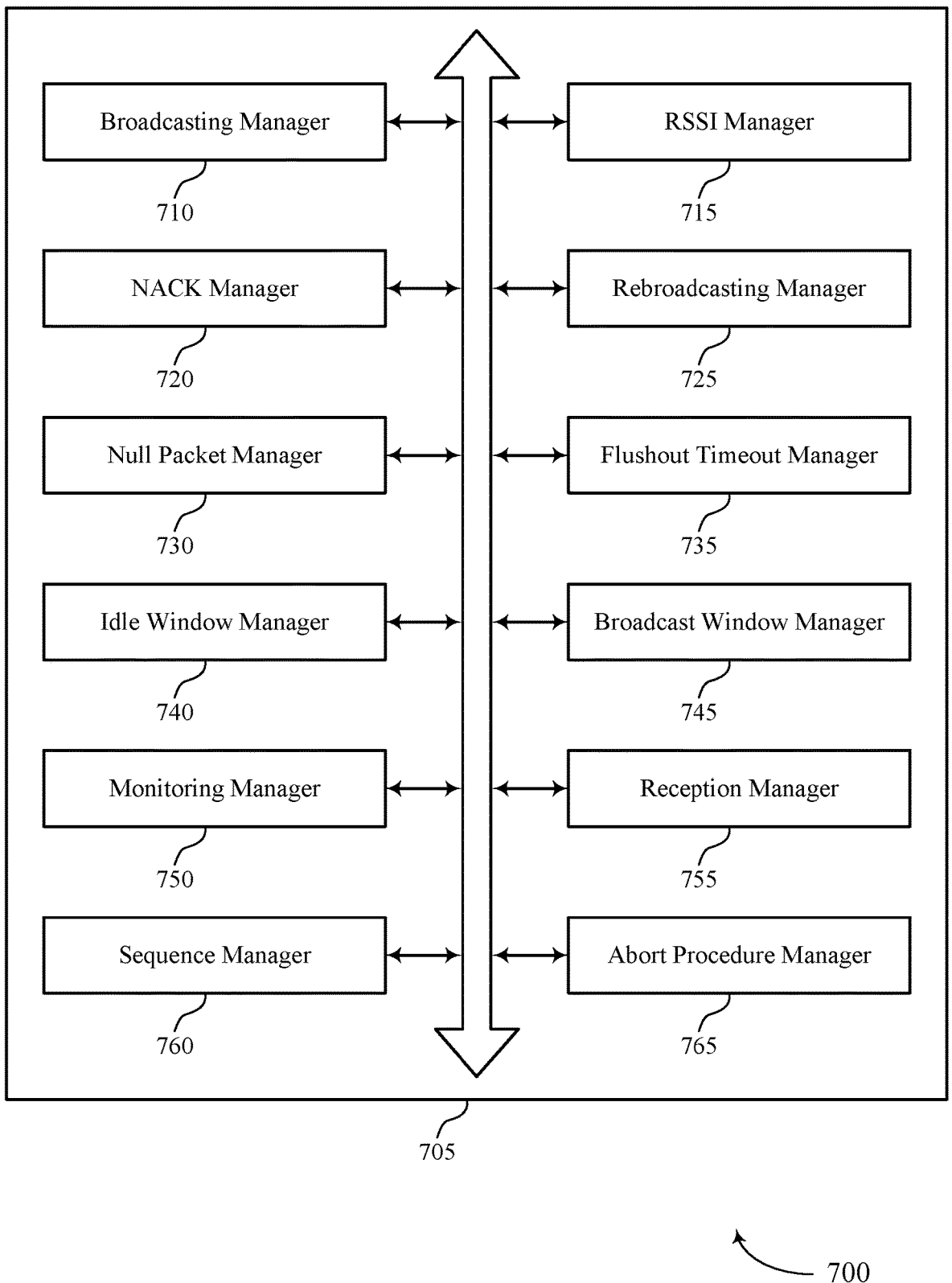
FIG. 7 shows a block diagram of a communications manager that supports on-demand retransmissions in broadcast communication in accordance with aspects of the present disclosure.

FIG. 7 shows a block diagram 700 of a communications manager 705 that supports on-demand retransmissions in broadcast communication in accordance with aspects of the present disclosure. Communications manager 705 may be part of a broadcasting device or a receiving device, or a device that is capable of operating as both a broadcasting device or a receiving device. The communications manager 705 may be an example of aspects of a communications manager 515, a communications manager 615, or a communications manager 810 described herein. The communications manager 705 may include a broadcasting manager 710, a RSSI manager 715, a NACK manager 720, a rebroadcasting manager 725, a null packet manager 730, a flushout timeout manager 735, an idle window manager 740, a broadcast window manager 745, a monitoring manager 750, a reception manager 755, a sequence manager 760, and an abort procedure manager 765. Each of these modules may communicate, directly or indirectly, with one another (e.g., via one or more buses).

The broadcasting manager 710 may broadcast a first Bluetooth packet over a channel bandwidth during a first set of one or more master slots of a periodic broadcast window. In some examples, the broadcasting manager 710 may broadcast, during a third set of one or more master slots of the periodic broadcast window, a second Bluetooth packet based on the determining. In some examples, the broadcasting manager 710 may broadcast a third Bluetooth packet over the channel bandwidth during a fourth set of one or more master slots of the periodic broadcast window, where the third set of one or more master slots and the fourth set of one or more master slots include the same number of master slots, and where the third Bluetooth packet is broadcast after a duration of the third set of one or more master slots and a third set of one or more slave slots.

In some examples, the broadcasting manager 710 may broadcast the first Bluetooth packet occurs during a first occurrence of the periodic broadcast window, and where rebroadcasting the first Bluetooth packet occurs during a second occurrence of the periodic broadcast window subsequent to the first occurrence of the periodic broadcast window. In some cases, the first Bluetooth packet includes a sequence number including one or more bits. In some cases, the first set of one or more master slots are located in a first occurrence of the periodic broadcast window, and where the second set of one or more master slots are located during a second occurrence of the periodic broadcast window subsequent to the first occurrence of the periodic broadcast window.

The RSSI manager 715 may perform one or more received signal strength indication (RSSI) measurements during a first set of one or more slave slot of the periodic broadcast window. In some examples, the RSSI manager 715 may perform one or more received signal strength indication (RSSI) measurements during a second set of one or more slave slots of the periodic broadcast window. In some examples, the RSSI manager 715 may determine, based on the one or more RSSI measurements during the second set of one or more slave slots, that no receiving devices have transmitted a NACK signal corresponding to the first Bluetooth packet. In some examples, the RSSI manager 715 may detect energy on a first frequency, a second frequency, or both a first frequency and a second frequency, from a first receiving device based on the one or more RSSI measurements, where receiving the one or more NACK signals is based on detecting energy on the first frequency, the second frequency, or both the first frequency and the second frequency.

The NACK manager 720 may receive from one or more receiving devices, based on the one or more RSSI measurements, one or more NACK signals corresponding to the first Bluetooth packet. In some examples, the NACK manager 720 may generate, based on a failure to receive the first Bluetooth packet, a sequence of bits based on the monitoring. In some examples, the NACK manager 720 may transmit, based on the generated sequence of bits, one or more NACK signals for the first Bluetooth packet in a set of one or more slave slots subsequent to the first set of one or more master slots of the periodic broadcast window. In some examples, the NACK manager 720 may transmit a first NACK signal of the one or more NACK signals over a first frequency. In some examples, the NACK manager 720 may transmit a second NACK signal of the one or more NACK signals over a second frequency. In some examples, the NACK manager 720 may refrain from transmitting one or more NACK signals subsequent to the second set of one or more master slots based on receiving the first Bluetooth packet during the second set of one or more master slots of the periodic broadcast window.

The rebroadcasting manager 725 may rebroadcast, during a second set of one or more master slots of the periodic broadcast window, the first Bluetooth packet based on the one or more NACK signals.

The monitoring manager 750 may monitor a channel bandwidth for a first Bluetooth packet during a first set of one or more master slots of a periodic broadcast window.

The reception manager 755 may receive, based on the NACK signal, the first Bluetooth packet during a second set of one or more master slots of the periodic broadcast window. In some examples, the reception manager 755 may receive a second Bluetooth packet during a third set of one or more master slots of the periodic broadcast window. In some examples, the reception manager 755 may initiate reception of the second Bluetooth packet during a fourth set of one or more master slots of the periodic broadcast window. In some examples, the reception manager 755 may determine that the second Bluetooth packet has been successfully received in a prior set of one or more master slots of the periodic broadcast window.

The null packet manager 730 may broadcast a null Bluetooth packet over the channel bandwidth during a first master slot of a third set of one or more master slots of the periodic broadcast window.

The flushout timeout manager 735 may identify a flushing timeout. In some examples, the flushout timeout manager 735 may determine that the flushing timeout has expired. In some examples, the flushout timeout manager 735 may perform a flushing procedure based on the identifying and the determining.

The idle window manager 740 may perform one or more of a band scan, a synchronization procedure, or adding a new receiving device to a set of one or more receiving devices, during a periodic idle window. In some examples, the idle window manager 740 may perform one or more of a band scan, a synchronization procedure, or adding a new receiving device to a group of one or more receiving devices, during a periodic idle window.

The broadcast window manager 745 may configure the periodic broadcast window with a configurable duration based on latency requirements for the channel bandwidth. In some cases, the periodic broadcast window has a configurable duration based on latency requirements for the channel bandwidth.

The sequence manager 760 may identify a sequence number including one or more bits based on the initiated reception. The abort procedure manager 765 may abort continued reception of the second Bluetooth packet based on the identified sequence number and the determining.

Figure 8:
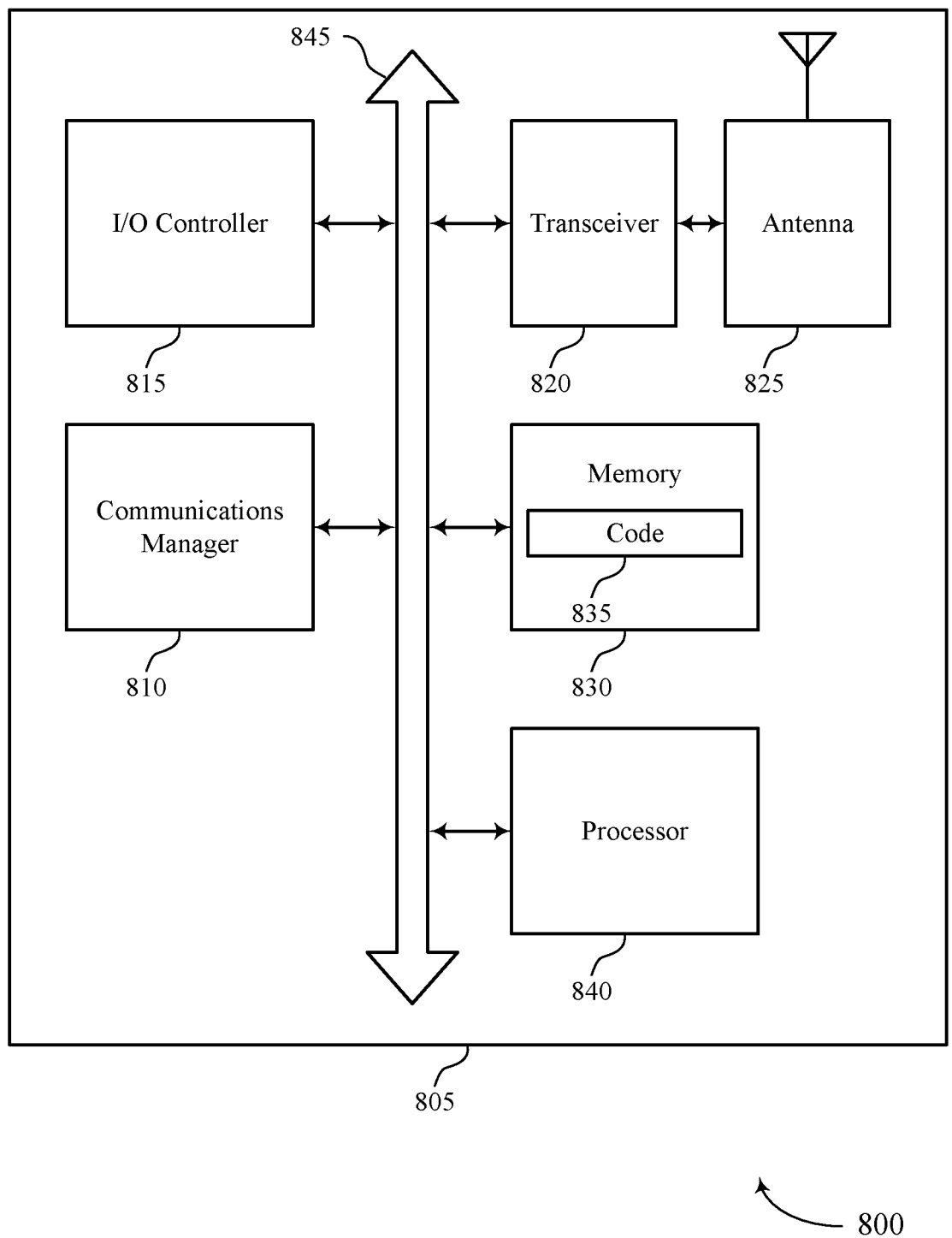
FIG. 8 shows a diagram of a system including a device that supports on-demand retransmissions in broadcast communication in accordance with aspects of the present disclosure.

FIG. 8 shows a diagram of a system 800 including a device 805 that supports on-demand retransmissions in broadcast communication in accordance with aspects of the present disclosure. Device 805 may be a broadcasting device or a receiving device, or a device that is capable of operating as both a broadcasting device or a receiving device. The device 805 may be an example of or include the components of device 505, device 605, or a device as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may broadcast a first Bluetooth packet over a channel bandwidth during a first set of one or more master slots of a periodic broadcast window, perform one or more received signal strength indication (RSSI) measurements during a first set of one or more slave slot of the periodic broadcast window, receive from one or more receiving devices, based on the one or more RSSI measurements, one or more NACK signals corresponding to the first Bluetooth packet, and rebroadcast, during a second set of one or more master slots of the periodic broadcast window, the first Bluetooth packet based on the one or more NACK signals. The communications manager 810 may also monitor a channel bandwidth for a first Bluetooth packet during a first set of one or more master slots of a periodic broadcast window, generate, based on a failure to receive the first Bluetooth packet, a sequence of bits based on the monitoring, transmit, based on the generated sequence of bits, one or more NACK signals for the first Bluetooth packet in a set of one or more slave slots subsequent to the first set of one or more master slots of the periodic broadcast window, and receive, based on the NACK signal, the first Bluetooth packet during a second set of one or more master slots of the periodic broadcast window.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting on-demand retransmissions in broadcast communication).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
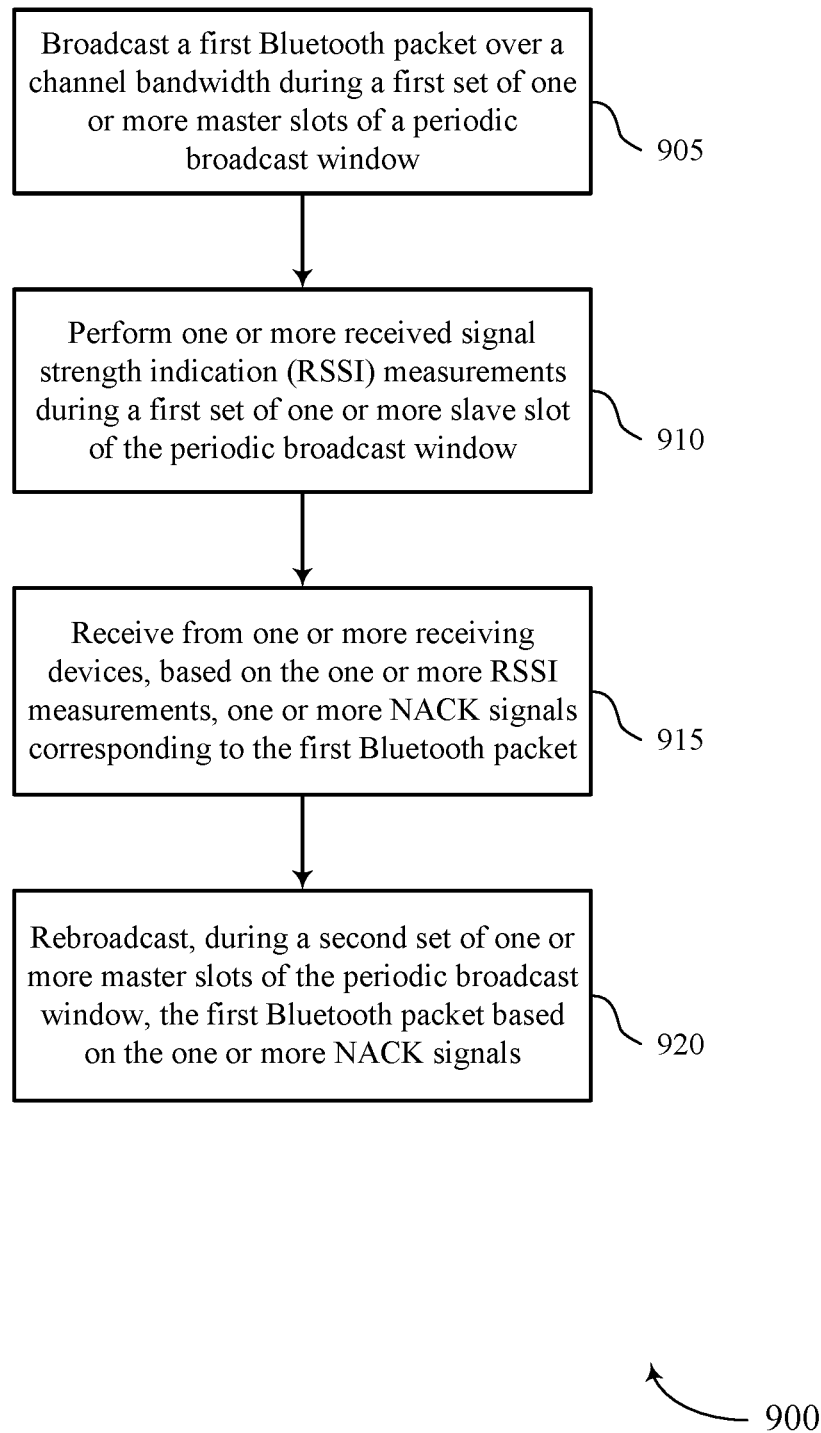
FIGS. 9 and 10 show flowcharts illustrating methods that support on-demand retransmissions in broadcast communication in accordance with aspects of the present disclosure.

FIG. 9 shows a flowchart illustrating a method 900 that supports on-demand retransmissions in broadcast communication in accordance with aspects of the present disclosure. The operations of method 900 may be implemented by a device or its components as described herein. For example, the operations of method 900 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 905, the device may broadcast a first Bluetooth packet over a channel bandwidth during a first set of one or more master slots of a periodic broadcast window. The operations of 905 may be performed according to the methods described herein. In some examples, aspects of the operations of 905 may be performed by a broadcasting manager as described with reference to FIGS. 5 through 8.

At 910, the device may perform one or more received signal strength indication (RSSI) measurements during a first set of one or more slave slot of the periodic broadcast window. The operations of 910 may be performed according to the methods described herein. In some examples, aspects of the operations of 910 may be performed by a RSSI manager as described with reference to FIGS. 5 through 8.

At 915, the device may receive from one or more receiving devices, based on the one or more RSSI measurements, one or more NACK signals corresponding to the first Bluetooth packet. The operations of 915 may be performed according to the methods described herein. In some examples, aspects of the operations of 915 may be performed by a NACK manager as described with reference to FIGS. 5 through 8.

At 920, the device may rebroadcast, during a second set of one or more master slots of the periodic broadcast window, the first Bluetooth packet based on the one or more NACK signals. The operations of 920 may be performed according to the methods described herein. In some examples, aspects of the operations of 920 may be performed by a rebroadcasting manager as described with reference to FIGS. 5 through 8.

Figure 10:
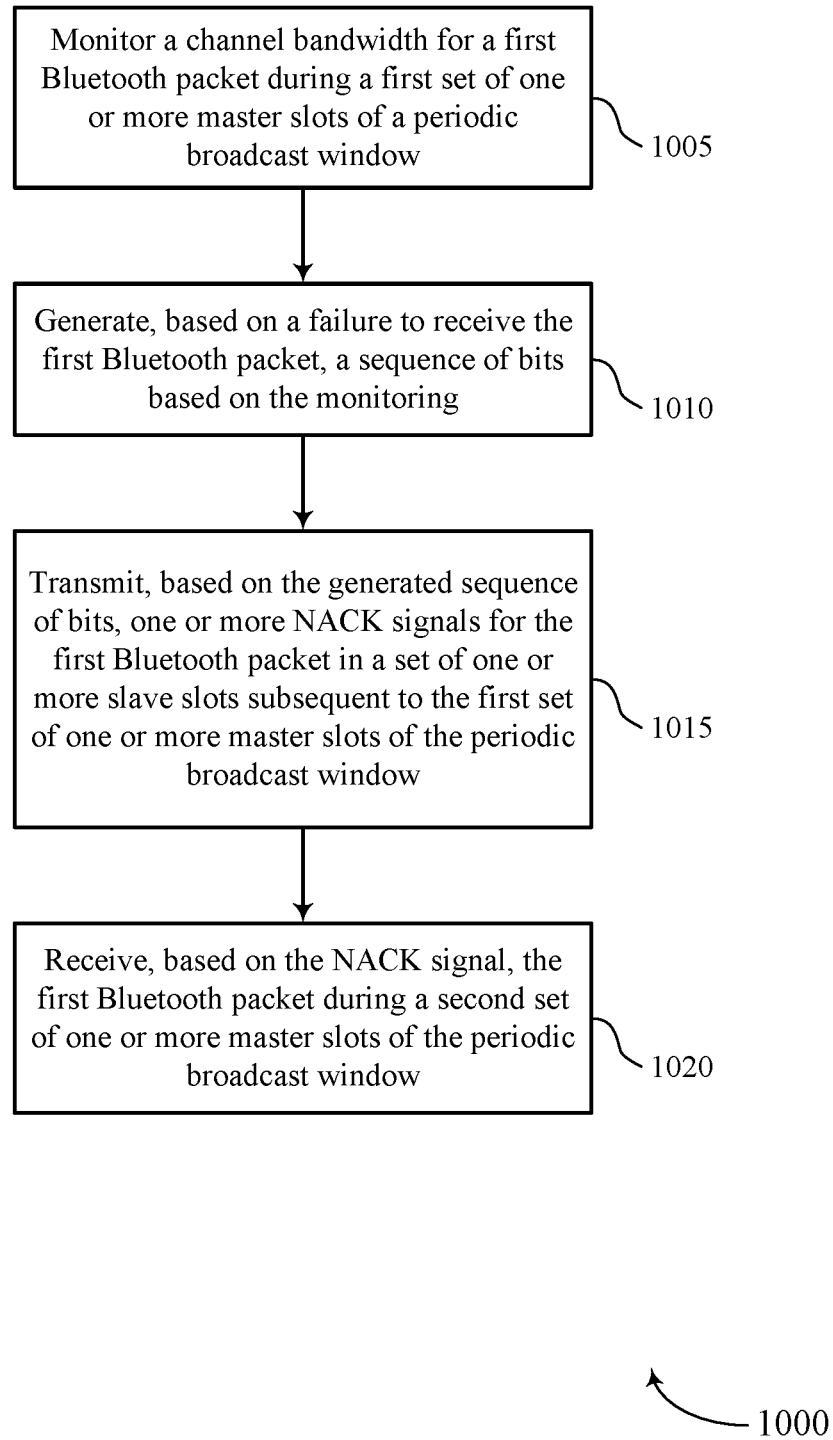

FIG. 10 shows a flowchart illustrating a method 1000 that supports on-demand retransmissions in broadcast communication in accordance with aspects of the present disclosure. The operations of method 1000 may be implemented by a device or its components as described herein. For example, the operations of method 1000 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1005, the device may monitor a channel bandwidth for a first Bluetooth packet during a first set of one or more master slots of a periodic broadcast window. The operations of 1005 may be performed according to the methods described herein. In some examples, aspects of the operations of 1005 may be performed by a monitoring manager as described with reference to FIGS. 5 through 8.

At 1010, the device may generate, based on a failure to receive the first Bluetooth packet, a sequence of bits based on the monitoring. The operations of 1010 may be performed according to the methods described herein. In some examples, aspects of the operations of 1010 may be performed by a NACK manager as described with reference to FIGS. 5 through 8.

At 1015, the device may transmit, based on the generated sequence of bits, one or more NACK signals for the first Bluetooth packet in a set of one or more slave slots subsequent to the first set of one or more master slots of the periodic broadcast window. The operations of 1015 may be performed according to the methods described herein. In some examples, aspects of the operations of 1015 may be performed by a NACK manager as described with reference to FIGS. 5 through 8.

At 1020, the device may receive, based on the NACK signal, the first Bluetooth packet during a second set of one or more master slots of the periodic broadcast window. The operations of 1020 may be performed according to the methods described herein. In some examples, aspects of the operations of 1020 may be performed by a reception manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications comprising:
broadcasting a first Bluetooth packet over a channel bandwidth during a first set of one or more master slots of a periodic broadcast window;
performing one or more received signal strength indication (RSSI) measurements during a first set of one or more slave slot of the periodic broadcast window;
receiving from one or more receiving devices, based at least in part on the one or more RSSI measurements, one or more negative acknowledgement (NACK) signals corresponding to the first Bluetooth packet; and
rebroadcasting, during a second set of one or more master slots of the periodic broadcast window, the first Bluetooth packet based at least in part on the one or more NACK signals.

2. The method of claim 1, further comprising:
performing one or more received signal strength indication (RSSI) measurements during a second set of one or more slave slots of the periodic broadcast window;
determining, based at least in part on the one or more RSSI measurements during the second set of one or more slave slots, that no receiving devices have transmitted a NACK signal corresponding to the first Bluetooth packet; and
broadcasting, during a third set of one or more master slots of the periodic broadcast window, a second Bluetooth packet based at least in part on the determining.

3. The method of claim 1, further comprising:
broadcasting a null Bluetooth packet over the channel bandwidth during a first master slot of a third set of one or more master slots of the periodic broadcast window; and broadcasting a third Bluetooth packet over the channel bandwidth during a fourth set of one or more master slots of the periodic broadcast window, wherein the third set of one or more master slots and the fourth set of one or more master slots comprise the same number of master slots, and wherein the third Bluetooth packet is broadcast after a duration of the third set of one or more master slots and a third set of one or more slave slots.

4. The method of claim 1, further comprising:
detecting energy on a first frequency, a second frequency, or both a first frequency and a second frequency, from a first receiving device based at least in part on the one or more RSSI measurements, wherein receiving the one or more NACK signals is based at least in part on detecting energy on the first frequency, the second frequency, or both the first frequency and the second frequency.

5. The method of claim 1, further comprising:
identifying a flushing timeout;
determining that the flushing timeout has expired; and
performing a flushing procedure based at least in part on the identifying and the determining.

6. The method of claim 1, further comprising:
performing one or more of a band scan, a synchronization procedure, or adding a new receiving device to a set of one or more receiving devices, during a periodic idle window.

7. The method of claim 1, wherein:
broadcasting the first Bluetooth packet occurs during a first occurrence of the periodic broadcast window, and wherein rebroadcasting the first Bluetooth packet occurs during a second occurrence of the periodic broadcast window subsequent to the first occurrence of the periodic broadcast window.

8. The method of claim 1, wherein the periodic broadcast window has a configurable duration based at least in part on latency requirements for the channel bandwidth.

9. The method of claim 1, wherein the first Bluetooth packet includes a sequence number comprising one or more bits.

10. A method for wireless communications comprising:
monitoring a channel bandwidth for a first Bluetooth packet during a first set of one or more master slots of a periodic broadcast window;
generating, based at least in part on a failure to receive the first Bluetooth packet, a sequence of bits based at least in part on the monitoring;
transmitting, based at least in part on the generated sequence of bits, one or more negative acknowledgement (NACK) signals for the first Bluetooth packet in a set of one or more slave slots subsequent to the first set of one or more master slots of the periodic broadcast window; and
receiving, based at least in part on the NACK signal, the first Bluetooth packet during a second set of one or more master slots of the periodic broadcast window.

11. The method of claim 10, further comprising:
transmitting a first NACK signal of the one or more NACK signals over a first frequency; and
transmitting a second NACK signal of the one or more NACK signals over a second frequency.

12. The method of claim 10, further comprising:
refraining from transmitting one or more NACK signals subsequent to the second set of one or more master slots based at least in part on receiving the first Bluetooth packet during the second set of one or more master slots of the periodic broadcast window.

13. The method of claim 10, further comprising:
receiving a second Bluetooth packet during a third set of one or more master slots of the periodic broadcast window;
initiating reception of the second Bluetooth packet during a fourth set of one or more master slots of the periodic broadcast window;
identifying a sequence number comprising one or more bits based at least in part on the initiated reception;
determining that the second Bluetooth packet has been successfully received in a prior set of one or more master slots of the periodic broadcast window; and
aborting continued reception of the second Bluetooth packet based at least in part on the identified sequence number and the determining.

14. The method of claim 10, further comprising:
performing one or more of a band scan, a synchronization procedure, or adding a new receiving device to a group of one or more receiving devices, during a periodic idle window.

15. The method of claim 10, wherein the first set of one or more master slots are located in a first occurrence of the periodic broadcast window, and wherein the second set of one or more master slots are located during a second occurrence of the periodic broadcast window subsequent to the first occurrence of the periodic broadcast window.

16. The method of claim 10, wherein the periodic broadcast window has a configurable duration based at least in part on latency requirements for the channel bandwidth.

17. An apparatus for wireless communications comprising:
a processor,
memory in electronic communication with the processor; and
instructions stored in the memory and executable by the processor to cause the apparatus to:
broadcast a first Bluetooth packet over a channel bandwidth during a first set of one or more master slots of a periodic broadcast window;
perform one or more received signal strength indication (RSSI) measurements during a first set of one or more slave slot of the periodic broadcast window;
receive from one or more receiving devices, based at least in part on the one or more RSSI measurements, one or more negative acknowledgement (NACK) signals corresponding to the first Bluetooth packet; and
rebroadcast, during a second set of one or more master slots of the periodic broadcast window, the first Bluetooth packet based at least in part on the one or more NACK signals.

18. The apparatus of claim 17, wherein the instructions are further executable by the processor to cause the apparatus to:
perform one or more received signal strength indication (RSSI) measurements during a second set of one or more slave slots of the periodic broadcast window;
determine, based at least in part on the one or more RSSI measurements during the second set of one or more slave slots, that no receiving devices have transmitted a NACK signal corresponding to the first Bluetooth packet; and
broadcast, during a third set of one or more master slots of the periodic broadcast window, a second Bluetooth packet based at least in part on the determining.

19. The apparatus of claim 17, wherein the instructions are further executable by the processor to cause the apparatus to:
- broadcast a null Bluetooth packet over the channel bandwidth during a first master slot of a third set of one or more master slots of the periodic broadcast window; and
- broadcast a third Bluetooth packet over the channel bandwidth during a fourth set of one or more master slots of the periodic broadcast window, wherein the third set of one or more master slots and the fourth set of one or more master slots comprise the same number of master slots, and wherein the third Bluetooth packet is broadcast after a duration of the third set of one or more master slots and a third set of one or more slave slots.

20. The apparatus of claim 17, wherein the instructions are further executable by the processor to cause the apparatus to:
- detect energy on a first frequency, a second frequency, or both a first frequency and a second frequency, from a first receiving device based at least in part on the one or more RSSI measurements, wherein receiving the one or more NACK signals is based at least in part on detecting energy on the first frequency, the second frequency, or both the first frequency and the second frequency.

* * * * *